(12) United States Patent
Fitzpatrick, III

(10) Patent No.: US 8,973,118 B2
(45) Date of Patent: Mar. 3, 2015

(54) TOKEN BASED SECURITY PROTOCOL FOR MANAGING ACCESS TO WEB SERVICES

(75) Inventor: Kenneth Leroy Fitzpatrick, III, Delaware, OH (US)

(73) Assignee: Cellco Partnership, Basking Ridge, NJ (US)

( * ) Notice: Subject to any disclaimer, the term of this patent is extended or adjusted under 35 U.S.C. 154(b) by 124 days.

(21) Appl. No.: 13/326,119

(22) Filed: Dec. 14, 2011

(65) Prior Publication Data

US 2013/0160099 A1    Jun. 20, 2013

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................. 726/7; 726/3; 726/4; 726/9

(58) Field of Classification Search
CPC .......... H04L 9/32; H04L 9/3213; H04L 67/02
USPC ...................................................... 726/1–21
See application file for complete search history.

(56) References Cited

U.S. PATENT DOCUMENTS

| | | | |
|---|---|---|---|
| 8,281,382 B1 * | 10/2012 | Sanyal et al. ...................... 726/9 |
| 2005/0182843 A1 * | 8/2005 | Reistad et al. ................ 709/230 |
| 2007/0186112 A1 * | 8/2007 | Perlin et al. .................... 713/182 |
| 2009/0094680 A1 * | 4/2009 | Gupta et al. ....................... 726/3 |
| 2009/0283589 A1 * | 11/2009 | Moore et al. .................... 235/382 |
| 2010/0161973 A1 * | 6/2010 | Chin et al. ..................... 713/159 |
| 2010/0278173 A1 * | 11/2010 | Dalton et al. ................. 370/352 |
| 2011/0055903 A1 * | 3/2011 | Leggette ........................... 726/4 |
| 2011/0154435 A1 * | 6/2011 | Fot et al. ........................... 726/1 |
| 2011/0320628 A1 * | 12/2011 | Gutarin et al. ................ 709/231 |

* cited by examiner

*Primary Examiner* — Andrew Nalven
*Assistant Examiner* — Khang Do

(57) ABSTRACT

Token based techniques for managing client access to individual methods or resources provided by an application or service can be implemented at the application server hosting the application or service. Such techniques include performing client authentication and authorization based on information associated with the client as specified in a security token generated for the client. The security token associated with the client enables a service provider to monitor and control client access to the methods of the service on an individual basis.

22 Claims, 6 Drawing Sheets

TOKEN BASED SECURITY PROTOCOL FOR MANAGING ACCESS TO WEB SERVICES

BACKGROUND

Many advanced networks provide XML based web services that enable individual clients and systems access to network data. For example, such web services may be based on one or more network protocols designed to facilitate communications between clients and web servers that host one or more services for the clients. Examples of such communication protocols include, but are not limited to, the Simple Object Access Protocol (SOAP) and the Hyper-Text Transfer Protocol (HTTP). A common example of a web service is a virtual web meeting service. A web service generally provides to clients one or more operations or functions, which may be referred to as "methods" of the service. Examples of methods that a web meeting service typically provides include, but are not limited to, a create new meeting method, a cancel meeting method, and an update meeting method.

To access the methods of a web service, a client generally establishes a network connection to a web server hosting the particular web service. Accordingly, the web service is typically associated with a specific uniform resource locator (URL) that defines the host name and port number for network communications in addition to, for example, the particular location of the web service application in the directory structure of the server. Once a connection is established with the client, the web service provides access to its data and methods, as requested by the client.

Traditionally, web service providers have been able to implement various security measures for controlling client access. However, traditional solutions do not provide a way for a web service to track and limit client access to its methods on an individual basis. For example, traditional solutions enable the web service to only authorize client access for the service as a whole, including all of its methods, or alternatively, deny client authorization, thereby entirely restricting a client's access to all web service methods.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
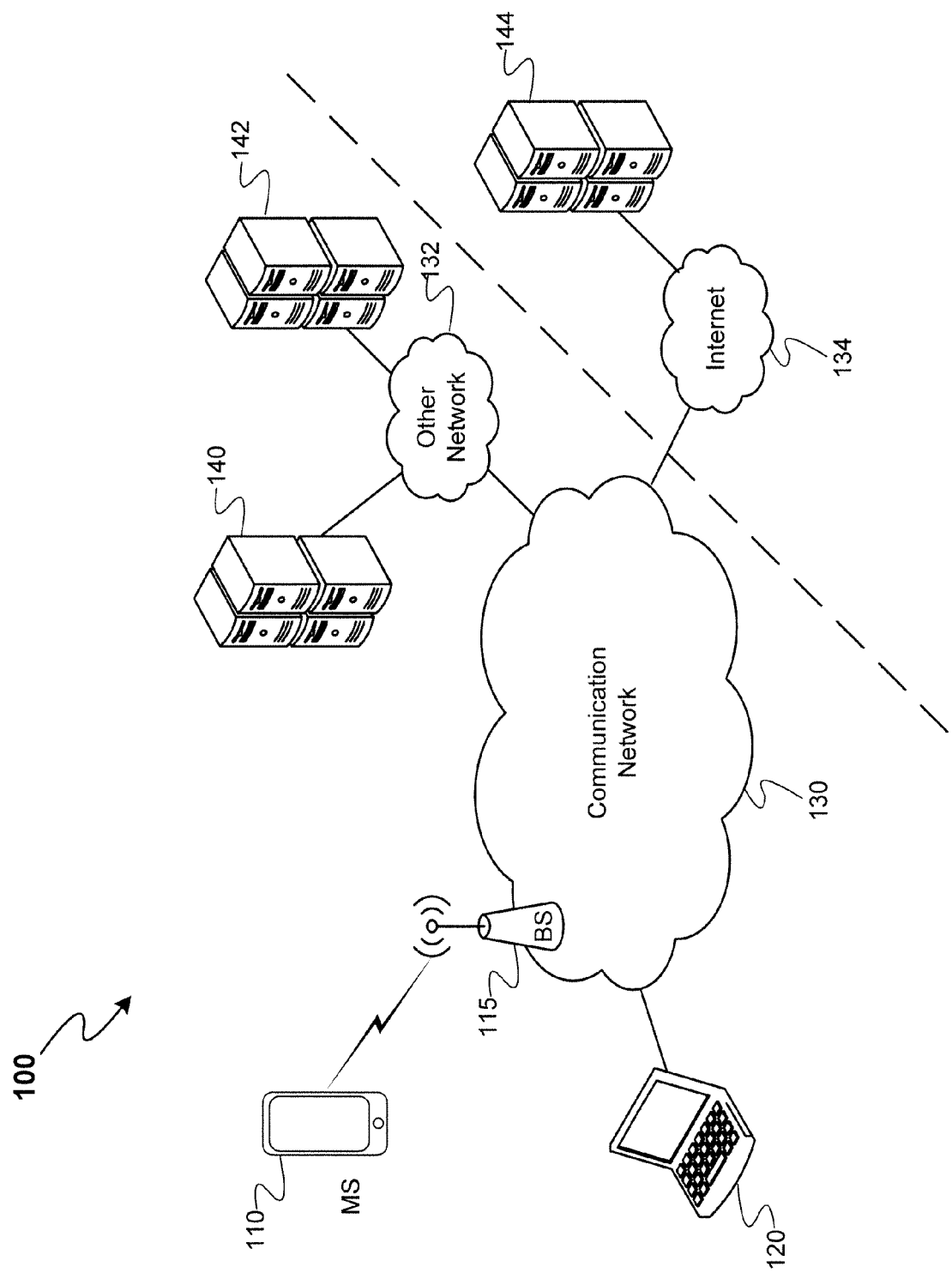
FIG. 1 illustrates an exemplary communication system offering a variety of communication services, including communications for message validation and client authorization for controlling client access to individual methods of a service hosted at a server in the system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In contrast to conventional solutions that only enable a web service to authorize client access to the service, including all of its methods, as a whole, the various techniques and systems disclosed herein relate to authenticating and authorizing client access to the individual methods of a service, such as a service configured to process client messages in an extensible markup language (XML) format. These techniques can also be used by the service provider for tracking which methods are being accessed by clients. The techniques may benefit service providers by enabling them to control and track exactly which methods any particular client is authorized to use. Furthermore, this capability may benefit clients of the service by enabling service providers to notify particular clients of any changes made to a given method so as to help these clients avoid any potential problems when attempting to access the method.

In an exemplary method, a request message requesting access to a particular function from among a plurality of functions offered by a web service is received from a client at a user device. For example, the request message may be received at the server hosting the web service. The request message includes a function identifier identifying the particular function and further includes a security token associated with the client. The security token is validated based on token validation information included within the security token and the function identifier. The security token is generally associated with one or more of the functions of the web service. Authentication information for the client is extracted from the security token, and used to authenticate the client. If the security token is successfully validated based on the token validation information and the function identifier and if the client is successfully authenticated in accordance with the authentication information extracted from the security token, the request message from the client is processed such that the particular function as identified by the function identifier in the request message is made accessible to the client through the communication network. An appropriate response message is sent through the communication network to the client at the user device based on the processing of the request message and the validation of the security token and the authentication of the client.

The detailed description below uses a number of terms with respect to various system components and operations. Although generally known, use of several of these terms may not be strictly standardized in the art. For the convenience of the reader, the following definitions for some of the relevant terms are presented, as used by way of example in the detailed description below.

The terms "service" and "web service" are used interchangeably herein to refer broadly and inclusively to any unit of software functionality that is exposed to at least one other service, application, or system on a local area network, wide area network, or even a single process. For example, such functionality of the web service may be provided to one or more clients via an interface described in a machine-readable format, for example, the Web Services Description Language (WSDL). A web service generally passes messages (e.g., requests and responses) to and from clients as a form of communication through the communication network. Furthermore, the communication network can include, but is not limited to, the Internet or World Wide Web, and the service can be a web service hosted at a server configured to exchange communication with clients over the Internet. A service that uses messages in an extensible markup language (XML) format is typically referred to as an "XML service." An example of a commonly used network communication protocol that uses messages in XML format is the Simple Object Access Protocol (SOAP). Services that use the SOAP protocol are often called SOAP services. For example, a SOAP service may define a message envelope which contains a header portion and a body portion. Further, each SOAP message may be included or wrapped in a Hyper-Text Transfer Protocol (HTTP) message for communication over the Internet.

The term "client" is used herein to refer broadly to any process configured to consume a functionality of a service offered by a server. For example, when a client uses a service, the client is generally utilizing at least one function of the service. Such a client may be executed at any type of computing device including, for example and without limitation, a desktop computer or workstation, a mobile device, or a host or network device that may operate at other times as a server to other clients. Such a server may be any type of computing device capable of communicating data to one or more clients over a communication network. Further, a client can be any type of remote or local process with respect to the computing device executing or hosting the service. Also, a client can be another service. With respect to client access, the term "authentication" is used herein to refer generally to the function of verifying the identity of a client for purposes of allowing access to the functionality provided by a service. Additionally, the term "authorization" is used herein to refer generally to the function of verifying the particular function(s) that the client, once authenticated, is permitted to access.

Reference now is made in detail to the examples illustrated in the accompanying drawings and discussed below. An exemplary network system is described initially with respect to FIG. 1. The network system provides a variety of communication services between different clients and servers, including communications for token-based message validation and client authentication or authorization for managing client access and to individual functions of a service hosted at a server in the system. Following the description of the system, network elements and processes related to message validation and client authentication/authorization for controlling client access to the individual functions of a service are described with respect to FIGS. 2-5.

As will be described in further detail below, the techniques described herein rely on a security token that is generated by, for example, a provider of the web service for one or more clients that have requested access to the functions of the service. Further, these techniques may be implemented, for example, within the web service itself. When requesting access to a desired function of the web service, the client includes the security token within a request message. For example, the client request from the client is received at the web server hosting the web service. Upon receiving the client request, the service determines whether the message from the client includes a security token and thus, requires the web service to invoke a token validation and client authentication procedure, to be described in further detail below with respect to FIGS. 2 and 3. For example, the client request may be a standard web page request, which generally would not require the token validation and client authentication procedure to be invoked. Assuming the client request includes a security token, the web service extracts various items of information from the security token and from the original client request itself. Information from the security token in addition to the other information extracted from the client request are provided to the client authorization/validation procedure, in a similar manner as parameters passed between different functions of a general computer software application.

In the example illustrated in FIG. 1, system 100 includes a client device 110 and a client device 120, which communicate request messages to one or more servers 140, 142 and 144 (hereinafter collectively referred to as "servers 140") through a communication network 130, which can include, for example, one or more interconnected networks such as a network 132 and the Internet 134. As noted above, system 100 as illustrated in FIG. 1 can be used to provide a variety of communications, including communications for authenticating and authorizing client access to an individual function of a service hosted at a server in the system. For example, client devices 110 and 120 can each be configured to execute a client application for communicating with a service hosted on one or more of servers 140 through network(s) 130. Further, any one of servers 140 can be configured to provide such a service by enabling various types of functionality (e.g., in the form of different functions of the service) to either client device 110 or device 120 through a local area network or wide area network such as the Internet (134).

Communication network 130 of system 100 facilitates communications between various types of clients and at least one server for purposes of client access to the functionality of a service hosted at the server. Such functionality can be implemented in the form of one or more processing functions accessible to the client. In addition, network 130 further supports communications for devices that do not execute client applications or participate in any particular service hosted at any of servers 140. Network 130 can thus be any network or combination of networks in an overall communication network for transmitting data communications between various devices associated with the communication network. Network 130 can include, but is not limited to, a wired (e.g., Ethernet) or a wireless (e.g., Wi-Fi or 4G) network. In addition, network 130 can include a local area network, medium area network, and/or wide area network. Network 130 can support protocols and technology including, but not limited to, Internet or World Wide Web protocols and communication services. Intermediate network routers, gateways, or servers may be provided between components of system 100 as may be necessary depending upon a particular network implementation or computing environment.

While the example in FIG. 1 shows only two client devices 110 and 120, system 100 can be used to facilitate data communications for additional devices (not shown) over communication network 130. Similarly, system 100 can include other servers in addition to servers 140, 142 and 144 for receiving request messages from one or more of the client devices. Furthermore, the present techniques may be implemented in communication network 130 using any of a variety of available communication networks and/or on any type of computing device compatible with such a network. As such, FIG. 1 is used herein to provide only a very simplified example of a few relevant elements of system 100 and network 130, for purposes of discussion and ease of explanation.

The functionality of a particular web service is generally provided for the benefit of a user of a client device via a client application program, process, or interface (or simply "client") that is executed on the device for enabling data communications with an associated application server through communication network 130. For example, the client may be implemented on either device 110 or device 120 as a web interface for a web service hosted at one of servers 140, 142 and 144. Such a web interface may be used by each respective user of the client devices to access the functions of the web service during execution of a web browser application on the device. Alternatively, the client may be a dedicated application program that is installed and executed on either device specifically for enabling the user to access the functionality provided by a particular web service.

As noted above, the client applications (or simply "clients") for requesting access to the functionality of a web service can be configured to execute on many different types and configurations of devices. The client devices 110 and 120 are examples of two types of client devices that may be used for communicating request messages to a web service hosted at one or more of server(s) 140, 142, and 144. In the example shown in FIG. 1, client device 110 is a mobile station or device for accessing mobile wireless communications services through communication network 130, for example, via one or more base stations (BSs) 115. Thus, client device 110 can be any type of mobile computing device capable of data communications over one or more networks. Examples of such mobile computing devices include, but are not limited to, portable handsets, smart-phones, tablet computers, and personal digital assistants. Similarly, client device 120 can be any type of general purpose computing device, such as a desktop personal computer. An exemplary implementation of such client devices capable of implementing a client will be described further below with respect to FIG. 7.

In an example of FIG. 1, the client application that is executed at either client device 110 or client device 120 is preconfigured by or registered with an associated web service or application. For example, client access to the web service may require an initial registration process. As part of such a registration process, a security token may be generated for the client by, for example, the web service or application provider. It would be apparent given this description that such a process may be either a manual process performed by the service provider or an automated process. Such an automated process may be invoked, for example, when the client initially sends a request message requesting access to a function provided by the web service to the server hosting the web service.

As will be described in further detail below, the security token generated for the client is used by the client for requesting access to one or more processing functions or resources provided by the web service through communication network 130 (e.g., from an application or web server hosting the web service/application). As noted above, the client sends a request message requesting access to an individual resource or function of the web service. The request message from the client includes the security token and any other client-specific information (e.g., user credentials, IP address, and/or client domain name as described further below), if available or required to gain access to the requested resource or function. The request message may be formatted in any number of well-known formats in accordance with one or more network communication protocols used for sending communication requests for accessing the functions of a web service hosted on a server in the network. As noted above, a common format for such messages uses XML. A common XML formatted protocol used for web service communications is SOAP. For example, SOAP message sent from client 120 to server 144 through networks 130 and 134.

In the example shown in FIG. 1, to ensure that the application or web service offered by, for example, server 144 is available to only authorized clients, the provider of the application/web service uses a security token validation and client authentication processes (e.g., processes 200 and 300 of FIGS. 2 and 3, as described further below). These processes may be implemented at server 144. Alternatively, the service provider can deploy an authentication server (not shown). For example, the authentication server could be a separate physical server, or implemented as another program module running on the same hardware platform as the server application. In the latter example involving a separate authentication server, when the server application (server 144 in our example) receives a service access request message from a client application on a device 110 or 120, the server application provides appropriate information to the authentication server to allow server application (at server 144) to authenticate the client associated with the device based on various attributes associated with the security token included in the message, as outlined herein. Upon successful authentication, the authentication server in this example informs the server application of server 144, which in turn provides the client application on the device with access to the requested web service or resource via data communication through the various communication elements of network 130.

In an example, a client may be authenticated by the web service initially, upon establishing a data connection, in order to verify the client's identity. Upon successful authentication, the web service can use a client authorization or validation process for authorizing the client's use or access of a particular function or resource of the service. As will be described in further detail below, the client may, for example, specify the name of the particular function within the request message communicated from the client to the web service through the communication network.

In a further example, credential information is extracted from the security token (e.g., as provided in the header of a SOAP request message from the client), and then used for authenticating and authorizing the client's access to the requested function (e.g., as specified in the message body). The security token has a specific structure or format definition that specifies the items of information that correspond to particular portions of the security token (e.g., bit fields of a security token in binary format). As will be described in further detail below using the exemplary process flowchart as shown in FIG. 3, the web service extracts various pieces of information from the different portions of the security token as specified by the token structure/format definition. By controlling the information that is required to appear in the security token sent by a particular client, the web service can control the level of authorization to be used for that client in relation to the individual functions for which the client may request access.

Figure 2:
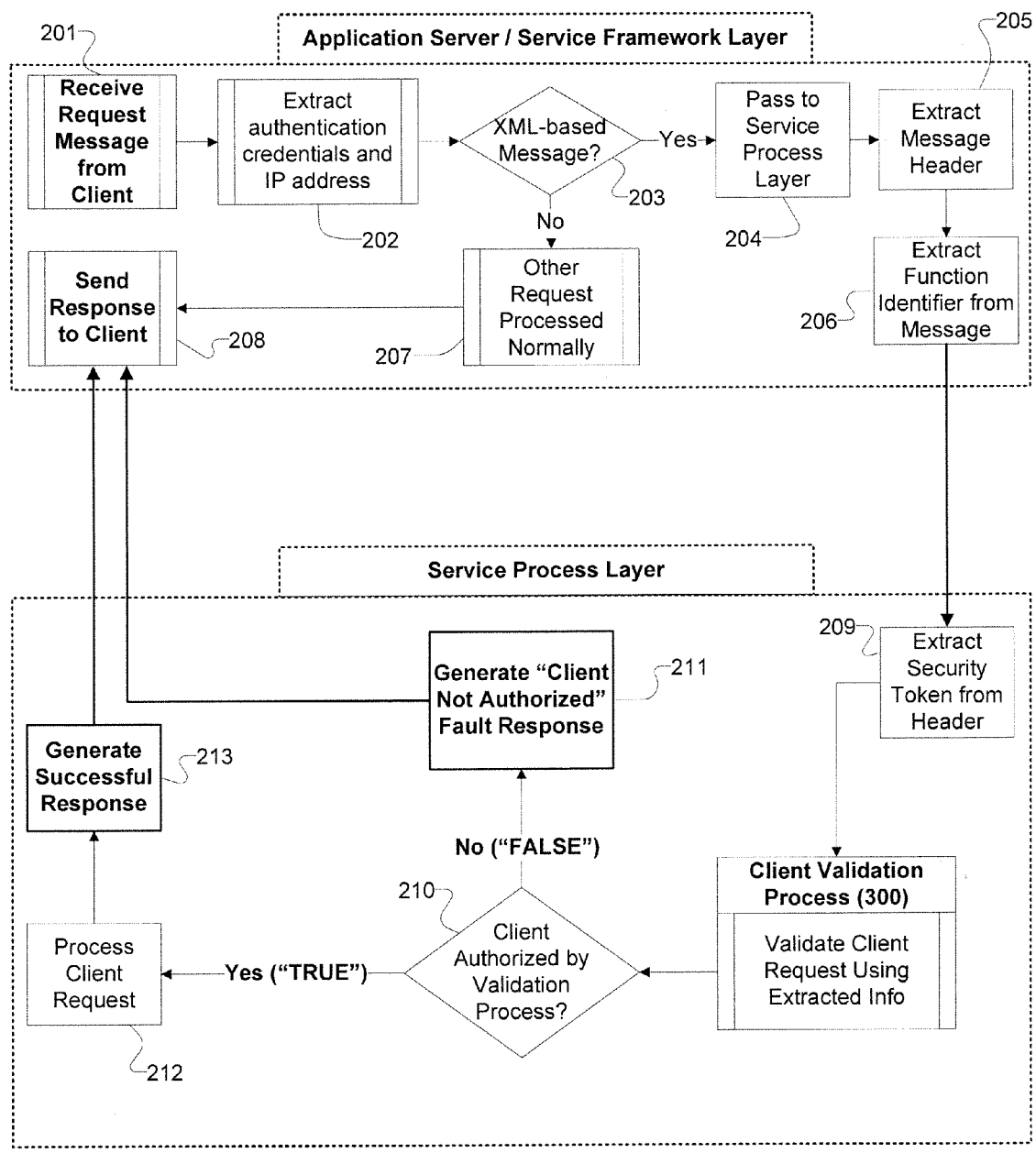
FIG. 2 is a flowchart of an exemplary process of a server for client authentication and message validation for use in execution of a service hosted at the server.
Figure 3:
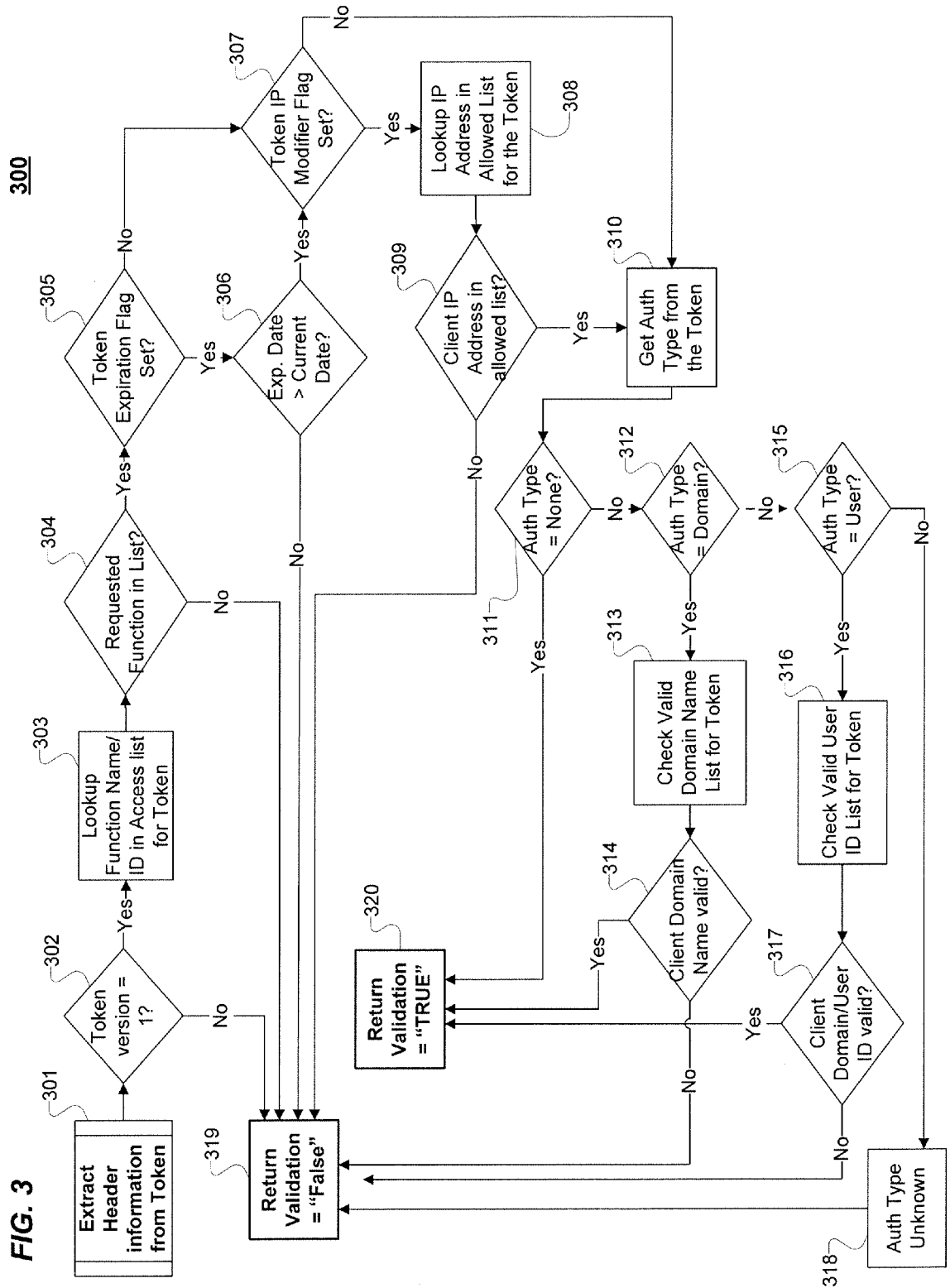
FIG. 3 is a flowchart of an exemplary process of the server for client authorization and security token validation in furtherance of the message validation process as shown in FIG. 2.

FIGS. 2 and 3 provide additional examples and description related to token based techniques for managing client access to individual functions of a service. The exemplary processes described below with respect to FIGS. 2 and 3 are implemented in a server hosting the service for purposes of authenticating and authorizing client access to the individual functions of the service. These processes can also be used by the server or service provider for tracking which functions are being accessed by clients.

For ease of explanation, the security token validation and client authentication example processes of FIGS. 2 and 3, respectively, will be described in the context of an XML web service hosted at a web server. Further, for ease of explanation, the XML service referenced in the examples will rely on SOAP and HTTP for purposes communicating messages between the web service of the server and its clients. However, it is noted that these examples are not intended to be limited to XML services or SOAP messages. The communication message may be structured or formatted in accordance with any number of well known protocols or formats for passing messages in a communication network. Additionally, the examples described below can be used for purposes of managing client access to individual functions of a service regardless of the message format or how the security token must be identified in the message due to any particular network implementation.

In general, the format of an XML-based (e.g., SOAP) request message includes a message header and a message body. For the example flowcharts shown in FIGS. 2 and 3, the client embeds the security token within the header portion of the SOAP message. Similarly, the client embeds the name or other identifier of the web service function that is the subject of the request within the body of the SOAP message. Further, the SOAP message itself is embedded or wrapped within a standard HTTP request message from the client to the web server. Accordingly, other information the web service may extract from the request sent by the client, as noted above, may include an Internet protocol (IP) address for the client or various login credentials (e.g., username and password information) associated with the client. As will be described below with respect to FIG. 2, the login credential information can be extracted from the HTTP message for purposes of authenticating the client to use the web service.

Although not shown in FIG. 2, it should be noted that the client in this example may be a client previously registered to use the service, as previously described. As part of the client registration process, at least one security token is generated specifically for the client. The token is used to designate which resources (i.e., functions) of the service the client will be able to access. Additional authentication information can also be assigned for the token depending on the particular client or computing environment. For example, different types of security tokens can be generated for different types of clients and environments, where each type of token provides the client access to particular functionality of the service based on the client's needs for a particular environment.

Furthermore, in order to ensure the security level of the token itself, each generated security token is encoded with a cryptographically random value of sufficient length to substantially reduce the likelihood of guessing the correct token values and to preclude any attempts by third-parties to hack or improperly generate the token. In an example, expected values of the security token are stored in one or more access lists used by the web service. For example, such access list(s) may be stored at a local data store or database accessible to the application or web server hosting the service. The stored access lists include a mapping of one or more parameters used in a client authentication and token validation process for determining whether the client (via the security token) is authorized to access the requested resource or function of the service (e.g., process 300 of FIG. 3, described below). Further, values for each of the required parameters for a particular client may be defined in the security token (e.g., in a header portion of the token, as described below). These parameters can be used by the service, via the client authentication process, to detect any fraudulent or unauthorized attempt by the client or third-party to gain access by, for example, altering or modifying values in the security token. As such, various authentication attributes or parameters may be incorporated into the security token to further increase the security or level of authentication required for a client during the client validation or authentication procedure/process. An example of such a security measure, described in further detail below, includes verifying the IP address for the client using a stored access list of known or allowable IP addresses. Another example, also described in further detail below, includes assigning an expiration date to the security token when it is generated, which can also be checked by the web service prior to allowing the client access to any requested functions.

In an example, an XML web service may be hosted at a web server in an enterprise system of a business organization. A client sends a request message to access the service based on a uniform resource locator (URL) associated with the web service or server hosting the service. For example, the URL may define the host name and port number that clients can use to direct data communication requests through the communication network to the service. Such a client may be, for example, an employee within an organization (e.g., a member of the sales team), where the organization has a web service accessible to its employees for accessing organizational or business-related resources or services (e.g., management tools for a business sales channel). Further, different types of tokens may be generated based on the particular needs of the particular employee or group within the organization to which the employee belongs. Thus, different operating environments may be configured in the enterprise system so as to expose only the processing functions of the service, to which a particular group of clients would need access.

Accordingly, a different type of security token may be generated for each operating environment or group of clients. The different operating environments may include, for example and without limitation, a training environment for training new employees, a quality assurance or testing environment for testing the functionality of the service, a development environment for developing new functionality or functions of the service, and a production environment for general access to the active functions of the service. The security tokens associated with each of the respective operating environments can then be used for controlling client access to either a subset or all of the functions provided by the service. The use of different security tokens for accessing individual functions of a service based on a particular client's needs or purpose enables the service provider to better control client access and the level of security associated with each access.

For ease of explanation, the various steps of process 200 as shown in FIG. 2, including the steps of process 300, as shown in FIG. 3, will be described in the context of an application or service framework layer and a service process layer of the service. For example, the service framework and process layers may correspond to functional layers of a web service application and/or server hosting such application. For example, functions associated with the service framework layer may include managing data connections with the client(s) for sending and receiving data communications over a communication network, including functions of the service relating to general message communications management in response to receiving request message(s) from one or more clients. Similarly, process steps in the service process/development layer may correspond to functions relating to processing the client request message itself. Thus, functions performed in this layer include managing client access to the service via a client authorization and security token validation process, described in detail below with respect to FIG. 3, and further includes generating an appropriate response to be sent to the client for receiving request message communications from one or more clients through a communication network.

Such functional layers as shown in FIG. 2 are presented for purposes of description and ease of explanation, and that neither process 200 nor process 300 are not intended to be limited to the example of FIG. 2. For example, the steps of processes 200 and 300 may be performed entirely within the same functional layer of the service. Alternatively, these process steps may be performed in another operational layer or framework (not shown) of the server hosting the service.

FIG. 2 is a flowchart of an exemplary process 200 that can be implemented at a server for client authentication and message validation for managing client access to functions of a service. In the exemplary flowchart as shown in FIG. 2, process 200 begins in step 201, in which a request message requesting access to a function of the service hosted at the server is received through a communication network from the client. As noted above, the request message is in the form of an XML or SOAP message wrapped in a standard HTTP message envelope. When the client (i.e., a registered client having a previously assigned security token) in this example sends the request message requesting access to a function of the service in our example, the client embeds the security token in a header portion of the XML message (e.g., in a SOAP message header) sent to the web service. However, as noted above, the structure of the request message and/or message format and how the token is identified in the message may vary depending on the particular communication protocol or implementation that is used. While the examples illustrated in FIGS. 2 and 3 and described herein refer to using SOAP and HTTP network protocols for client-server communications, the techniques described herein may be applied to any well-known network protocol or standard may be used as necessary.

In step 202, authentication or login credentials are extracted from the HTTP message for purposes of authenticating the client to use the web service, as noted above. In addition, the Internet protocol (IP) address used by the client in sending communication requests through the communication network is also extracted. As will be described in further detail below with respect to process 300 of FIG. 3, the IP address in addition to other information related to the client and/or the client request message can be used to be used to further control the level or type of authentication used in managing the client's access to the requested function.

Process 200 proceeds to step 203, which includes determining whether the message from the client is an XML-based (e.g., SOAP) message, which, in our example, necessarily includes a security token. For example, the web service may be configured such that all request messages requesting access to functions of the service sent in the form of XML or SOAP messages and include the security token that was previously assigned to the client, as described above. Thus, if it is determined in step 203 that the request message is a SOAP message including a security token, process 200 proceeds to step 204, in which the request message is passed to an XML/SOAP message processing framework of the web server. The message processing framework of step 204 includes step 205 for extracting the message header and step 206 for extracting, e.g., from the body of the message, information identifying the requested service and/or processing function of the service, for which the client is requesting access. For example, this identification information may be a name or numeric identifier associated with the service or function that has been published or previously made available by the service provider to clients for purposes of accessing the functions of the service. Further, if the service or server hosting the service includes a plurality of different services, it may be necessary for the client to identify both the service and the particular function of the service, for which the client is requesting access.

Referring back to step 203, if it has been determined that the request message received from the client is not an XML-based message or that this message does not include a security token for requesting access to the service or service function, process 200 proceeds to step 207, which includes processing the message without invoking the client authorization process 300, described below with respect to FIG. 3. For example, the request message from the client may be a general request for a web page that does not need access to the service or service function and therefore, does not require any message validation or client authorization steps (i.e., process 300) to be performed. In this case, process 200 concludes in step 208, in which a response is sent to the client based on the processing of the request in step 207. However, if the client request message includes a security token, process 200 can proceed to step 209, which includes extracting the security token from the message header (extracted previously in step 205). While the security token is included in the message header in this example, the token does not necessarily have to be placed in the header portion of the message and that the token can be placed in any portion of the message depending on the particular implementation. However, there may be certain performance advantages in terms of operational efficiency associated with requiring the token be placed in a standardized location, such as the message header, for all client request messages.

As described in steps 202, 205, 206 and 209, the web service extracts various items of information from the request message sent by the client, including information used for client authentication purposes. In addition to the information extracted directly from the request message (e.g., the function name from step 206 and the security token from step 209), additional authentication information may be derived from the operating system of the client device, the service framework and/or the network itself. Examples of additional authentication information that may be derived include, but are not limited to, the IP address of the client (step 202), a domain name of the client, and a user name or identifier associated with the client. Further, the different types of additional authentication information that may be used for client authentication and/or authorization can be extended over time, for example, to include new or additional technologies (e.g., X.509 public key digital certificates) as such technologies are later implemented in the service. This information may be acquired from the client based on the client request message using any one of various well-known techniques, the selection of which may be dependent on a particular implementation of the service or operating environment in which the service is executing.

In an example, the security token and service/function name or other identifier are required parameters for the client authorization process. Conversely, parameters corresponding to the additional authentication information may be optional for purposes of client authorization. However, with respect to client authentication, the service can require one or more of the additional authentication parameters to control the type of authentication needed for a particular client.

Reference now is made in detail to an exemplary token based client authorization and validation process, as shown in the flowchart of FIG. 3. In an example, once the client has been authenticated and the information associated with the client request message have been extracted using the above-described steps of process 200, the extracted information is provided to process 300 of FIG. 3. Specifically, the security token and the function name or other identifier, which, in our example, are extracted from the message header (step 209 of process 200) and message body (step 206 of process 200), respectively, are provided to process 300. As described above, the information provided to process 300 may further include the additional authentication information, as described above. For example, the security token and function name in addition to one or more additional authentication parameters (e.g., client domain name, client/user identifier (ID) and client IP address may be passed as parameters between different functions across the service framework and service process layers and/or within the service process layer. Any missing parameters may be provided between the different application or service layers using blank or null values.

Figure 4:
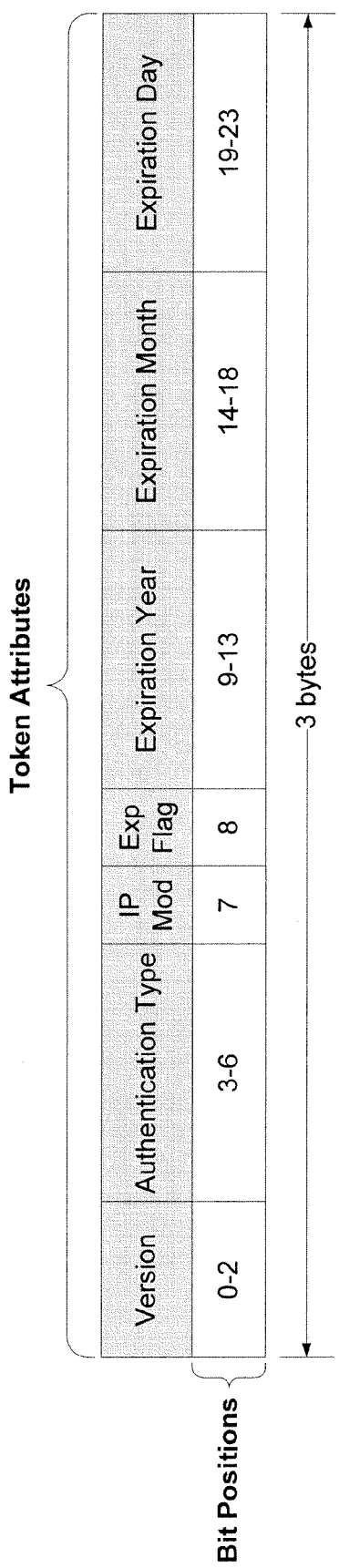
FIG. 4 is an exemplary bit field definition for a header portion of a security token for managing client access to an individual method of a service hosted at a server.
Figure 5:
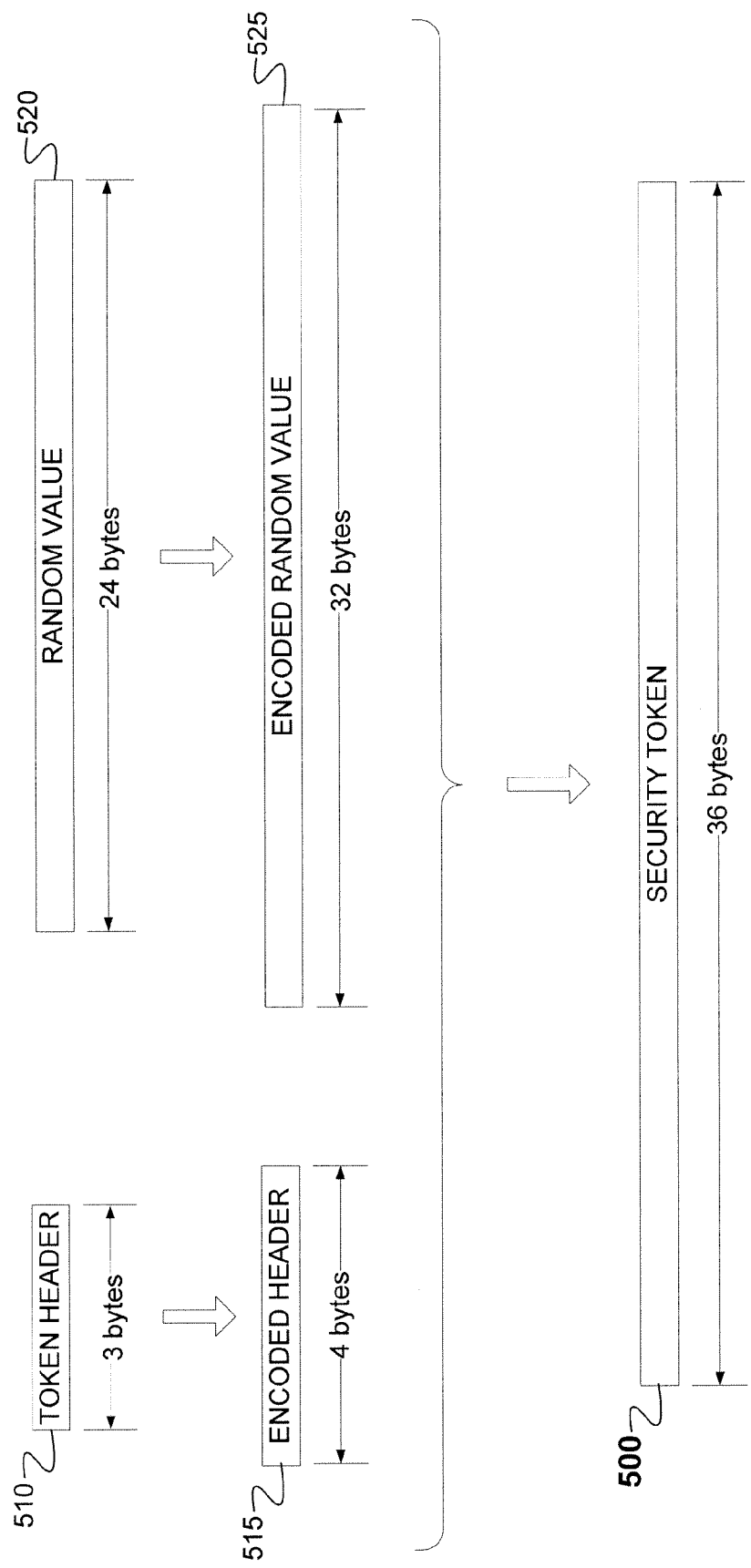
FIG. 5 is a diagram illustrating an exemplary technique for generating a security token having two portions, where each portion is generated and encoded separately before being concatenated to form the token.

FIG. 3 is a flowchart of an exemplary process 300 for performing client authorization and security token validation in furtherance of the message validation process 200 of FIG. 2, as described above. Referring back to the example flowchart of FIG. 2, process 300 is shown as a step to be performed as part of process 200. In accordance with the example as shown in FIG. 2, the steps of process 300 may be implemented as different functions executed by the web server, in this example, as part of a service process or development layer of the web service. For purposes of discussion and ease of explanation, process 300 will be described in the context of the exemplary security token format as shown in FIGS. 4 and 5, which will be described below. However, it is noted that neither process 200 nor process 300 is intended to be limited thereto. For example, process 300 may be customized as necessary depending on the particular structure, format or attributes used for the token, as will be discussed below.

As noted above, the additional authentication information, in this example, are optional by default for purposes of client authorization. However, as will be described in further detail below, the requirement of one of more of these additional authentication parameters during the client authorization process may be specified by defining specific values corresponding to the parameters in the security token itself. By controlling the information that is required to appear in the security token sent from a particular client, the service or service provider is able to control the type of authentication that is to be performed for the client in order for the client to access a requested function of the service successfully.

The use of the security token provides the service with such control over the authorization process is made possible because the security token has a well defined structure or format in which the various portions of the token correspond to different parameters. For example, such portions may include selectable options or flags that can be used to enable or disable the use of certain parameters during the client authorization process. Further, other portions of the security token may be used to define specific values corresponding to the different parameters that will be used.

An exemplary structure definition of a security token will be described in further detail below in reference to FIGS. 4 and 5. As shown in FIGS. 4 and 5, the security token in this example includes at least two portions: a header portion and a portion including a cryptographically secure value. For example, the latter portion of the token may include a cryptographically random numerical value generated using any one of various well-known techniques for generating such values. The header portion in particular has a definite structure or format, which is used in specifying various attributes or parameters for the client authentication and authorization process. As will be described in further detail using processes 200 and 300 of FIGS. 2 and 3, respectively, such attributes are used to define how the security token is analyzed during client request message validation and client authentication for managing client access to the individual resources and functions of a service.

FIG. 4 shows an exemplary bit field definition for a header portion of a security token for managing client access to individual functions of a service hosted at a server. The token header, as shown in the example of FIG. 4, is a numerical value having a length of three bytes. Also, as shown in FIG. 4, the twenty-four bits of the three-byte header are divided into various sets of bit positions or bit fields, where each bit field includes a value representing a different attribute used in the client authentication and token validation process 300, as noted above. The attributes corresponding to the bit fields of the header in this example include the following: a token version number (bits 0-2), an authentication type identifier (bits 3-6), an IP address modifier flag (bit 7), an expiration flag (bit 8), and an expiration date (bits 9-23). In this example, the bits (9-23) for the expiration date attribute further include three separate sub-parts bit fields of five bits each corresponding respectively to the expiration year (bits 9-13), month (bits 14-18) and day (bits 19-23) of the expiration date attribute. However, the attributes and associated functions are provided as examples and the techniques described herein are not intended to be limited thereto.

These attributes will be described in further detail below in the context of process 300 of FIG. 3. First, however, an exemplary technique for generating a security token including a header portion as defined by the exemplary bit field definition as shown in FIG. 4 will be described in reference to FIG. 5. FIG. 5 is a diagram illustrating an exemplary technique for generating a security token having two portions: a token header 510 and a random value 520. As shown in the example illustrated in FIG. 5, token header 510 and the random value 520 are generated and encoded separately prior to being concatenated with each other to form a single token 500. In an example, the security token 500 is a 36-byte base-64 encoded numerical value. Thus, for example, the first four bytes of token 500 may correspond to a base-64 encoded header that is concatenated to a 32-byte base-64 encoded cryptographically random value.

In our example, token header 510 is a 3-byte value that is generated and encoded into a 4-byte base-64 value (i.e., encoded header 515, as shown in FIG. 5). Token header 510 may be generated, for example, in accordance with the exemplary bit field definition of FIG. 4, as described above. In this example, random value 520 is a cryptographically random 192-bit (24-byte) value, which is encoded into a 32-byte base-64 value (i.e., encoded random value 525). As noted above, the two base-64 encoded portions (encoded header 515 and encoded random value 525) are then concatenated into the 36 byte (256 bit) token 500.

The initial random value 520 is cryptographically random to ensure the value could not be intelligently guessed knowing the state of the system that generated it. Any one of various well-known techniques for generating cryptographically secure random numbers may be used. For example, such techniques may be provided as a part of the particular computer programming language or framework that is used in an implementation. The examples shown in FIG. 5 and described herein are presented for illustrative purposes and that any format or bit field structure may be used for the token as necessary. However, it should be noted that the random value portion of the token is cryptographically secure so as to preclude any unauthorized client access attempts using fraudulent tokens. For example, using 192 bits to represent random value 520 ensures this value remains secure against any possible attempt to deduce the actual value being used for any given token.

Referring back to FIG. 3, process 300 begins in step 301, in which information is extracted from the header of the security token. The information extracted from the header includes values for the above-noted token attributes. These values will be used in process 300 for determining whether or not the client is authorized to access to the function of the service as requested (e.g., as specified in the message body). The function and possible values associated with each of the token attributes will be described in further detail with respect to the remaining steps of process 300.

Once the information has been extracted from the token header, process 300 proceeds to step 302, which includes determining the value of the token version. The version attribute of the token allows the token to evolve over time. For example, the web service provider can configure each version of a security token to be interpreted slightly differently, without having to modify the client application. Accordingly, all newer versions and implementations of the token should be backward compatible with older versions. In the example shown in FIG. 3, only tokens having a version equivalent to a value of '1' will be authorized to access the requested function of the service. However, it should be noted that other versions can also be supported, for example, by easily modifying process 300 as shown in FIG. 3 to include additional determination steps corresponding to each version supported.

If the version of the token in this example is not equivalent to a value of 1, then process 300 proceeds to step 319, in which process 300 concludes by returning a validation false message indicating the token has not been validated successfully and that the client should be denied access to the requested function. As will be described further below, the validation false message returned in step 319 and the validation true message returned in step 320 are processed in step 210 of process 200. If the version of the token is equivalent to a supported version (e.g., '1' in our example), process 300 continues to step 303. Step 303 includes performing a lookup operation to find the requested function name or other identifier (e.g., as specified in the message body, as described above) using a list of allowed functions. For example, this list of functions may be used to control the individual functions of the service that the particular client is authorized to access. Similar to step 302, if the function name is not found in the list, process 300 concludes in step 319 in which a validation false message is returned.

For example, the web service may store the known values in an access list corresponding to the different authorization types and the client. Such access lists may be stored in any number of places including, for example and without limitation, a file at the web server, a database accessible to the web server, or even hard-coded portion of a client request handler of the web server. Based on the comparison with values in the access list, the web service can determine and verify the authorization level for the particular client on an individual function basis.

If the requested function is in the allowed functions list, process 300 continues to step 305, which includes determining whether the token expiration flag is set. For example, the security token generated for the client may optionally include an expiration date, after which the client will no longer be able to access any functions of the service using the same token. In this case, a new security token having either a future expiration date or no expiration date specified would have to be generated for the client in order for this client to access functions of the service. If the expiration flag or bit in the token header (e.g., bit position 8 of the example token header of FIG. 4, as described above) is set to a value of 1, the bits following the expiration flag in the token header (e.g., bits 9-23 of the example header of FIG. 4) are used to specify the expiration date. For example, each of the year, month, and day fields of the expiration date may be represented by a two-digit decimal value, which has been converted to binary format for the respective bit fields of the token header in this example. As such, in step 306, the information corresponding to the expiration date bits will be converted to an internal date format and compared to the current date to determine if the token has expired. If the token has expired, a validation false message is returned in step 319.

Process 300 continues to step 307 if either the expiration date flag bit is not set (i.e., has a value of '0') in the token header or after step 306 once it is determined that the token has not expired (i.e., the expiration date> the current date). Step 307 includes determining whether the IP modifier flag or bit is set (i.e., has a value of '1'). If this bit is set to 1, the token will be compared to the IP address provided by a layer above the service process layer in which process 300 is executed, as described above and as illustrated in FIG. 2. For example the layer above the service process layer in this example is the service framework layer, as described above. Also, as described above and as shown in step 202 of process 200 in FIG. 2, the IP address may be extracted from the request message sent by the client (e.g., from the HTTP message wrapping the XML-based or SOAP request message).

If it is determined in step 307 that the IP modifier flag/bit of the token header is set, the IP address from the client request message is compared in step 308 with a list of known IP addresses. In an example, only clients having IP addresses included in the list are allowed access to the functions of the service. Like the function name list described above for steps 303 and 304, the IP address list is used to control client access to one or more functions of the web service. In a different example, the IP address list may be combined with the function name list such that each IP address in the IP address list is associated with a particular function or group of functions listed. For example, the use of such a combined list may provide the web service with yet another way to manage client access to the individual functions of the web service within the client authorization process. If in step 309, it is determined that the client's IP address is in the allowed list, process 300 proceeds to step 310. Otherwise, the validation false message is returned in step 319, indicating the token failed proper validation and hence, the client will be denied access to the requested function.

In step 310, the authentication type attribute of the token header, as shown in FIG. 4, is identified. The value in this bit field of the token header defines the type of authentication that is to be used in conjunction with token. Accordingly, the number of bits used to specify this attribute also defines the total number of possible types of authentication. For example, in reference to the example bit field definition for a token as shown in FIG. 4, since the bit field corresponding to authentication type is four bits, there are a total of sixteen possible types of authentication that can be specified using this particular token header structure. In an example, the types of authentication defined by this field or attribute correspond to authentication functions provided by a higher-level systems layer of the communication network relative to the service or application layer implementing the use of the token. As noted previously, the web service or server application may discover the token attribute information from, for example, the operating system of the client or from the communication network itself.

For ease of explanation, process 300 is described herein using the following example authentication types: client or user identifier (ID) and client/user domain name or other domain ID. The domain name/ID of the client may be provided by, for example, the operating system of the client (e.g., client's Windows Domain Name), assuming the client is part of a domain. However, the domain name of the client may be acquired using any one of various well-known techniques for acquiring such client domain information. For example, the domain name may be provided by a different component of the client's system or by the communication network. As the client domain name may or may not be available to the service, it is an optional parameter for the message validation process (e.g., process 200) and client authorization process (e.g., process 300). For example, if the domain name is not available or not a required authentication type that is specified in the security token header, then a blank or null value is passed to process 300.

The user ID authentication type, like the domain name type, may or may not be available to the service. The user ID is therefore an optional parameter for the client authorization and validation process as well. If it is not available, then a blank or null value may be passed to process 300. Also like the domain name type, the user ID may be provided by the client's operating system (e.g., user ID associated with the Windows Operating System). However, the client's user ID may be acquired using any one of various well-known techniques for acquiring such identifier information associated with the client.

It should be noted that any number of different authentication types may be used and that the techniques disclosed herein are not limited to the above-described examples. However, the total number of potential authentication types may still be limited based on the number of bits that are allocated to the corresponding bit field in the security token header, as described above. Also as described above, the use of each authentication type may be defined in the security token using a numeric value associated with the particular authentication type. The authentication type is not a required parameter for client authentication and authorization. Thus, a value in the security token indicating that no authentication type is specified may also be defined. For example, a decimal value of '0' may be used to represent none (i.e., no authentication type is specified), a decimal value of '1' to represent the domain name authentication type, and a decimal value of '2' may be used to represent the client/user ID authentication type.

As shown in FIG. 3, steps 311, 312, and 315 of process are used in determining the type of authentication associated with the particular client based on the identified value of the authentication type bit field, as described above. Thus, steps 311, 312, and 315 include determining whether the authentication type is set to any of the following example types, respectively: "none" (e.g., equivalent to a value of 0), "client domain" (e.g., equivalent to a value of 1), or "user ID" (e.g., equivalent to a value of 2). If the authentication type is not one of the recognized or supported types (i.e., step 318), process 300 concludes in 319 by sending a validation false message indicating the client is not authorized to access the function.

However, if the authentication type is set to client domain, process 300 proceeds from step 312 to steps 313 and 314. In step 313, the client's domain name, which was passed to process 300 as a parameter from process 200, as described above, is checked against a stored list of valid domain names for the security token (e.g., similar to the lookup or verification steps 303 and 308 for the function name and client IP address, respectively, as described above). If the domain name is verified as being in the allowed list, then process 300 proceeds from step 314 to 320, which includes returning a validation "TRUE" message indicating to process 200 that the client has been validated successfully and therefore, is authorized to access the requested function. Otherwise, a validation "FALSE" message is returned via step 319, as previously described.

If the authentication type is set to user ID, process 300 proceeds from step 315 to steps 316 and 317. In step 316, the user ID associated with the client, which was passed to process 300 as a parameter from process 200, as described above, is checked against a stored list of valid user IDs for the security token (e.g., similar to the lookup or verification steps 303, 308 and 314 for the function name, client IP address and client domain name, respectively, as described above). If the user ID is verified as being in the allowed list, then process 300 proceeds from step 317 to 320, which includes returning a validation "TRUE" message indicating to process 200 that the client has been validated successfully and therefore, is authorized to access the requested function. Otherwise, a validation "FALSE" message is returned via step 319, as previously described.

As described above, process 300 utilizes the information from the client and the client's request message as parameters to perform a series of checks in order to validate the client (and security token of the client) and thus, determine whether the client is allowed to access the requested function. Also as described above, process 300 returns either a "TRUE" or "FALSE" response to process 200 so as to indicate whether validation for the client has either passed or failed, respectively. It should be noted that the steps of process 300 related to token validation based on token validation information and the function identifier or name (steps 302, 303, and 308) and the steps related to client authentication (steps 310-318) may be performed in any different order from that shown in FIG. 3, as may be desired depending on a particular implementation. For example, the lookup of the function name or other identifier of step 303 may be performed after the aforementioned client authentication steps or simultaneously with these steps.

Referring back to FIG. 2, step 210 of process 200 receives the validation response sent from process 300. If process 300 returns "FALSE," the client is not authorized to use the function or resource of the service as requested because the information associated with the client as specified in the security token and the information known to the service about the client do not match. Accordingly, the processing of the message is terminated and a fault is passed back to the client indicating that it is not authorized to access the resource, as shown by steps 211 and 208. Alternatively, if process 300 returns "TRUE," the client is authorized to use function or resource of the service as requested because the information in the token and the information known about the client does match. The processing of the message is allowed to proceed and an appropriate response based on the client request is sent back to the client, as shown by steps 212, 213 and 208.

Figure 6:
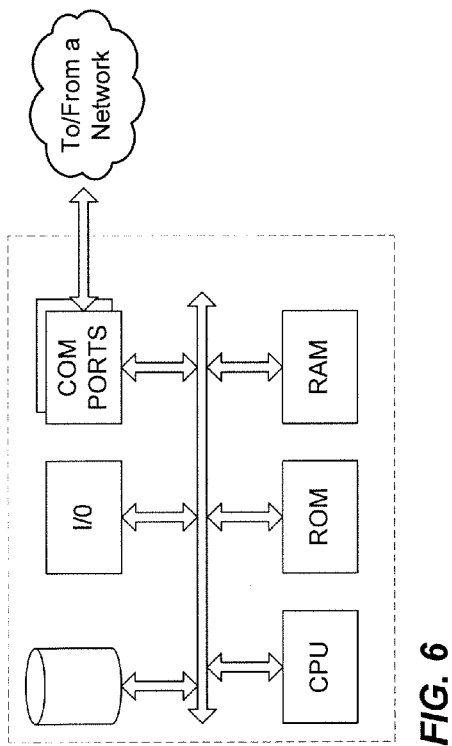
FIG. 6 is a simplified functional block diagram of an exemplary computer that may be configured to host a service, for example, to function as an application or web server in the system of FIG. 1.
Figure 7:
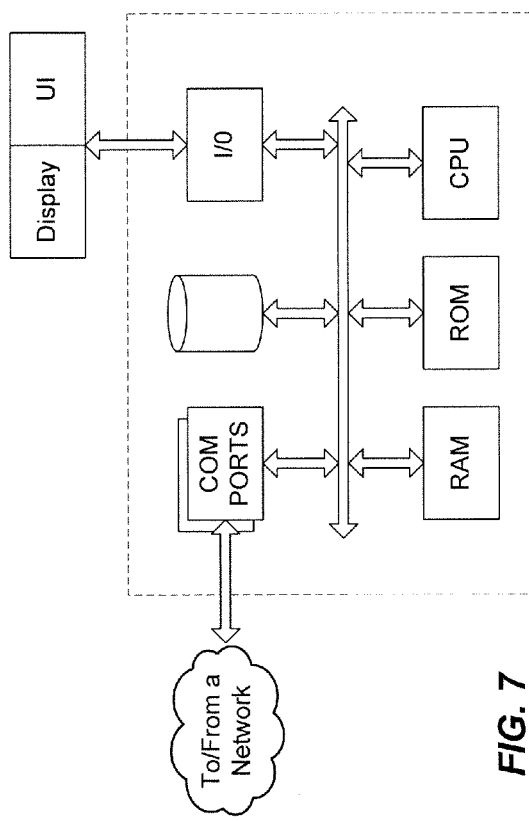
FIG. 7 is a simplified functional block diagram of an exemplary personal computer or other work station or terminal device.

FIGS. 6 and 7 provide functional block diagram illustrations of general purpose computer hardware platforms. FIG. 6 illustrates a network or host computer platform, as may typically be used to implement a server (e.g., servers 140, 142 or 144 of FIG. 1, as described above). FIG. 7 depicts a computer with user interface elements, as may be used to implement a personal computer or mobile device (e.g., devices 110 or 120 of FIG. 1, as described above). It is believed that the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the methods of processes 200 and 300 of FIGS. 2 and 3, respectively, as described above, may be embodied in programming. Program aspects of the technology may be thought of as "products" or "articles of manufacture" typically in the form of executable code or process instructions and/or associated data that is stored on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a web service provider into the computer platform of the application or web server that will be hosting the web service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer" or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the steps of processes 200 and 300, as shown in FIGS. 2 and 3, as well as the security token functionality as described above with respect to FIGS. 4 and 5. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the computer as illustrated in the example of FIG. 7 may be a mobile computer with user interface elements, as may be used to implement a laptop, tablet or notebook computer or the like. For example, such a device may include a touch-screen display for user input and output. Alternatively, the device may include a standard light emitting diode (LED) display and, for example, an alphanumeric keypad or T9 keyboard. It is believed that the structure, programming, and general operation of such computing equipment and as a result the drawing should be self-explanatory. As known in the data processing and communications arts, a mobile computer comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, WiFi, IrDA, Bluetooth, etc. The software functionalities involve programming, including executable code, associated stored data, and graphical user interface code for implementing a client application program at the mobile device. The software code is executable by the processor of the mobile computer. In operation, the code is stored within the mobile computer. At other times, however, the software may be stored at other locations and/or transported for loading into the appropriate mobile computer. Execution of such code by a processor of the mobile computer enables the mobile computer to implement the methodology for a client for requesting access to one or more functions offered by a web service, in essentially the manner performed in the implementation discussed and illustrated herein.

Further, the client can be implemented in a remote computer (or server) on a network. That is, a mobile device sends information (e.g., a request message, including a security token) to the remote server for requesting access to a function of a web service hosted at the server; and the remote server processes the request based on the security token for the client and returns an appropriate response to the mobile device over the network. In the example above, the mobile device operates as a client terminal and the remote computer as a server in a client-server network environment. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   at a server computing device hosting a web service, receiving through a communication network from a client executing at a user device, a request message requesting access to a particular function from among a plurality of functions offered by the web service, the request message including a function identifier identifying the particular function and a security token,
      the security token containing authentication information for the client and
      the security token being associated with the particular function offered by the web service;
   extracting the function identifier from a portion of the request message different from a further portion including the security token;
   extracting the authentication information for the client from the security token;
   validating the security token based on an expiration date of the security token and a source communication address flag, wherein the expiration date and the source communication address flag are included within the security token, and wherein the source communication address flag causes the server to verify a source Internet Protocol (IP) address of the request message as a part of validating the security token; and
   in response to the validation of the security token, validating the function identifier by directly identifying the function identifier in a list of allowable functions stored in a database of the server;
   authenticating the client based on the authentication information for the client extracted from the security token; and
   upon successfully validating the security token and the function identifier, and upon successfully authenticating the client in accordance with the authentication information extracted from the security token:
      processing the request message from the client so as to make the particular function as identified by the function identifier in the request message accessible to the client through the communication network, and
      sending a response message through the communication network from the server to the client at the user device based on the processing of the request message and the validation of the security token and the authentication of the client.

2. The method of claim 1, wherein:
   the request message is a Hyper-Text Transfer Protocol (HTTP) message comprising a Simple Object Access Protocol (SOAP) message;
   the SOAP message includes a message header and a message body;
   the message header of the SOAP message includes the security token; and
   the message body of the SOAP message includes the function identifier identifying the particular function.

3. The method of claim 1, wherein the validating of the security token further comprises:
   identifying, in a list of known IP addresses stored in the server, an IP address that corresponds to the source IP address associated with the particular function.

4. The method of claim 3, wherein the security token includes a cryptographically random value, and the cryptographically random value is used as a unique identifier for the security token in the database.

5. The method of claim 1, wherein the authenticating comprises:
   determining whether the client authentication information extracted from the security token specifies an authentication type for the client;
   upon determining that the client authentication information specifies the authentication type for the client, acquiring an authentication parameter corresponding to the authentication type specified for the client; and
   authenticating the client based on the acquired authentication parameter.

6. The method of claim 5, wherein the authentication type is at least one of a client domain name or a client user identifier.

7. The method of claim 5, wherein the authentication parameter is acquired from an operating system on the user device of the client.

8. The method of claim 5, wherein the authentication parameter is acquired from the communication network.

9. The method of claim 5, wherein the authentication of the client based on the security token associated with the client enables the server hosting the web service to track or limit the client's access to the plurality of functions offered by the web service on an individual basis rather than permitting or restricting access to the web service and the plurality of functions as a whole.

10. The method of claim 1, wherein a first portion of the security token received in the request message includes an encoded token header.

11. The method of claim 10, wherein a second portion of the security token received in the request message is encoded with a cryptographically random value.

12. The method of claim 10, wherein the token header encoded in the first portion of the security token includes the token validation information and the authentication information for the client.

13. An application server, comprising:
a network communication device configured to exchange data communications through a communication network, the communication network including at least one database accessible to the network communication device;
a processor coupled to the network communication device;
a storage device accessible to the processor; and
an application program in the storage device, the application program including a plurality of functions of a web service, wherein execution of the application program by the processor configures the application server to exchange data communications related to the plurality of functions of the web service with an associated client of a user device through the communication network,
wherein the processor is configured to perform functions including:
a message handling function to receive through a communication network from a client executing at a user device, a request message requesting access to one of the functions of the web service, the request message including a function identifier identifying the one function of the web service and a security token,
the security token containing authentication information for the client, and
the security token being associated with the one function offered by the web service;
a function identifier extraction function to extract the function identifier from a portion of the request message different from a further portion of the request message including the security token;
a client information extraction function to extract the authentication information for the client from the security token;
a token validation function to validate the security token based on an expiration date of the security token and a source communication address flag, wherein the expiration date and the source communication address flag are included within the security token, and wherein the source communication address flag causes the token validation function to verify a source Internet Protocol (IP) address of the request message;
a function identifier validation function to validate the function identifier by a direct identification of the function identifier in a list of allowable functions stored in a database of the application server, in response to the validation of the security token;
a client authentication function to authenticate the client based on the authentication information for the client extracted from the security token;

a request processing function to process the request message from the client so as to make the one function of the web service as identified by the function identifier in the request message accessible to the client through the communication network, when the security token is validated via the token validation function, when the function identifier is validated via the function identifier validation function and when the client is authenticated via the client authentication function; and
a response communication function to transmit a response message through the communication network to the client at the user device based on the processing of the request message.

14. An article of manufacture, comprising a non-transitory computer-readable medium and computer-executable instructions embodied in the medium that, if executed by a computing device, cause the computing device to perform functions including functions to:
receive through a communication network from a client executing at a user device, a request message requesting access to a particular function from among a plurality of functions offered by a web service hosted at the computing device, the request message including a function identifier identifying the particular function and a security token,
the security token containing authentication information for the client and
the security token being associated with the particular function offered by the web service;
extract the function identifier from a portion of the request message different from a further portion including the security token;
extract the authentication information for the client from the security token;
validate the security token based on an expiration date of the token and a source communication address flag, wherein the expiration date and the source communication address flag are included within the security token, and wherein the source communication address flag causes the computing device to verify a source Internet Protocol (IP) address of the request message as a part of validating the security token;
in response to the validation of the security token, validate the function identifier by a direct identification of the function identifier in a list of allowable functions stored in a database of the application server;
authenticate the client based on the authentication information for the client extracted from the security token; and
process the request message from the client so as to make the particular function as identified by the function identifier in the request message accessible to the client through the communication network, when the token is validated, the function identifier is validated, and the client is authenticated based on the authentication information; and
transmit a response message through the communication network from the server to the client at the user device based on the processing of the request message and the validation of the security token and the authentication of the client.

15. The article of claim 14, wherein:
the request message is a Hyper-Text Transfer Protocol (HTTP) message comprises a Simple Object Access Protocol (SOAP) message;

the SOAP message includes a message header and a message body;

the message header of the SOAP message includes the security token; and the message body of the SOAP message includes the function identifier identifying the particular function.

16. The article of claim 14, wherein the function to authenticate the client includes functions to:

determine whether the client authentication information extracted from the security token specifies an authentication type for the client;

acquire an authentication parameter corresponding to the authentication type specified for the client, if it is determined that the extracted client authentication information specifies the authentication type for the client; and authenticate the client based on the acquired authentication parameter.

17. The article of claim 16, wherein the authentication type is at least one of a client domain name or a client user identifier.

18. The article of claim 16, wherein the authentication parameter is acquired from an operating system on the user device of the client.

19. The article of claim 16, wherein the authentication parameter is acquired from the communication network.

20. The article of claim 14, wherein a first portion of the security token received in the request message is encoded with a token header.

21. The article of claim 20, wherein a second portion of the security token received in the request message is encoded with a cryptographically random value.

22. The method of claim 3, wherein the list of known IP addresses includes a list of source IP addresses and a list of function names that may be accessed from the listed source IP addresses.

* * * * *